Feb. 26, 1946.    H. M. STOLLER    2,395,514
PILOT WAVE GENERATOR
Filed July 7, 1942

INVENTOR
H. M. STOLLER
BY H. A. Burgess
ATTORNEY

Patented Feb. 26, 1946

2,395,514

UNITED STATES PATENT OFFICE 2,395,514

PILOT WAVE GENERATOR

Hugh M. Stoller, Mountain Lakes, N. J., assignor to Bell Telephone Laboratories, Incorporated, New York, N. Y., a corporation of New York Application July 7, 1942, Serial No. 450,037

6 Claims. (Cl. 171—123)

This invention relates to apparatus for generating an alternating wave of certain frequency, and more particularly to an electrical motor for generating a pilot wave of certain frequency such that variations of the frequency of the pilot wave are utilized to control the speed of the motor.

Heretofore, electric motors have been provided with suitable apparatus for generating a pilot wave whose variations of frequency have been employed to control the speed of the motors. One such motor together with a pilot wave speed regulator therefor is disclosed in my Patent 1,695,035, granted December 11, 1928. In the prior motors of the aforementioned type, the pilot wave generator was usually disposed at one end of the armature thereby tending to increase the overall axial length of the motor. Such prior motors were employed where the over-all length thereof was of no special concern. The present invention is especially applicable in situations where economy of both space and weight is an important factor, such as in the field of aircraft.

The present invention contemplates a pilot wave generator embodied in an electrical motor such that both the combined generator and motor effect substantially maximum economy of space and weight.

The object of the invention is to provide a combined motor and generator having substantially minimum weight and bulk without materially impairing the usefulness of either the motor or generator.

A motor of well-known structure comprises an armature composed of a plurality of laminations stacked on a suitable axle each of which laminations embodies a plurality of radial projections arranged in spoke-like fashion and having curvilinear portions formed integrally on the outer ends thereof. The alignment of corresponding radial projections and associated curvilinear portions forms effectively a plurality of radial segments extending axially of the axle for a certain distance. A pair of stator pole-pieces disposed on diametrically opposite sides of the armature extend coextensively axially therewith.

In accordance with a specific embodiment of the present invention, the aforementioned armature is arranged such that commencing at one end thereof, the curvilinear portions are cut off alternate segments for a predetermined axial distance, allowing the curvilinear portions to remain on other alternate segments as initially formed. In addition, one of the stator pole-pieces is adapted, at the armature end from which the curvilinear portions are cut away, to embody a further stator pole-piece onto which is applied a suitable electrical winding. The number of armature segments and speed of rotation thereof determine the frequency of the alternating wave induced in the winding of the further pole-piece.

The invention will be readily understood from the following description when taken together with the accompanying drawing in which.

Figure 1:
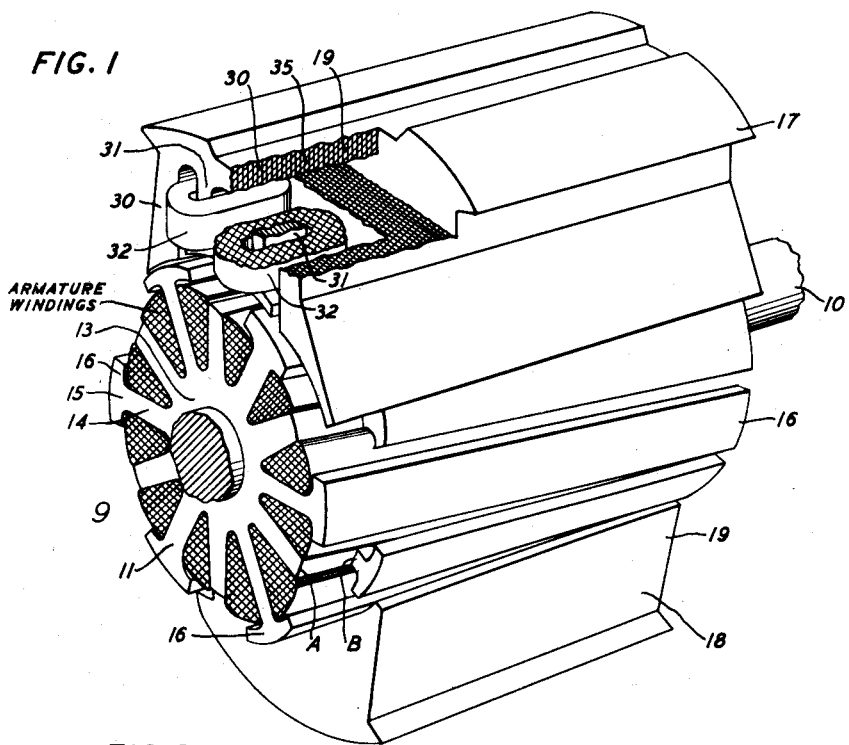
Fig. 1 is a fragmentary perspective view of an electrical motor embodying a specific embodiment of the invention.
Figure 6:
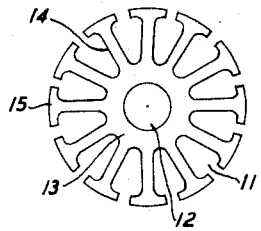
Fig. 6 is an elevational view of laminations forming a part of the armature of Fig. 1.
Figure 7:
Fig. 7 is an end view of the lamination shown in Fig. 6.

Referring to Fig. 1, an armature 9 comprises an axle 10 whose ends are mounted in suitable bearings, not shown, and has stacked thereon a plurality of laminations 11 arranged in a contiguous manner and possessing substantially a circular configuration which is flat on both opposite sides as shown in Figs. 6 and 7. Certain laminations 11 are to be modified in accordance with the invention which is to be hereinafter explained. Referring to Fig. 6, individual laminations 11 embody a central aperture 12 for effecting the threading thereof onto the axle 10, a hub portion 13, a plurality of radial projections 14 attached integrally in spoke-like fashion to the hub portion 13, and a plurality of curvilinear portions 15 former integrally on the outer ends of the radial projections 14. The contiguous stacking of the laminations 11 on the axle 10 is such that the alignment of the corresponding individual radial projections 14 and curvilinear portions 15 constitute effectively a plurality of discrete radial segments or teeth 16 extending along a longitudinal axis of the axle 10 as shown in Fig. 1. Suitable electrical windings are applied to the armature 9 in the slots between the teeth 16 in the usual manner for the usual purpose.

Figure 5:
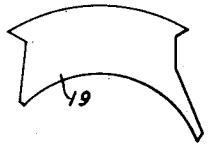

Disposed on diametrically opposite sides of the armature 9, Fig. 1 is a pair of stator pole-pieces 17 and 18. The pole-piece 18 comprises a plurality of laminations 19, Fig. 5, stacked in a contiguous manner and extending substantially coextensively with the armature 9 as shown in Fig. 1. The pole-piece 17 also extends substantially coextensively with both the pole-piece 18 and armature 9, Fig. 1, and comprises an unsymmetrical structure in accordance with the invention which will be subsequently explained. It is understood that the pole-pieces 17 and 18 embody suitable electrical windings, not shown, for effecting an energization thereof in the well-known manner. The foregoing describes, for the purpose of this illustration, substantially a direct current motor, although similar types of electrical apparatus embodying corresponding elements are also contemplated.

Figure 8:
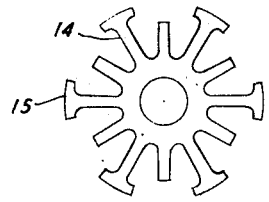
Fig. 8 is an elevational view of the armature lamination shown in Fig. 6 and modified in accordance with the specific embodiment of the present invention illustrated in Fig. 1.

In accordance with the present invention, a few of the stacked laminations 11 at one end of the armature 9, Fig. 1, have the curvilinear portions 15 cut off alternate radial projections 14 as shown in Fig. 8. At the one end of the assembled armature 9, this leaves every other tooth 16 cut back an axial distance A—B, Fig. 1. The radial projections 14 embodied in the individual laminations 11, Figs. 6 and 8, comprise an even number so that the teeth 16 having the cut-back portions occur the same number of times as the teeth 16 without such cut-back portions.

Figure 2:
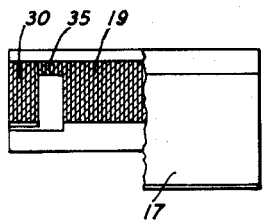
Fig. 2 is a partial elevational view of a stator pole-piece included in Fig. 1 and comprising a plurality of stacked laminations modified to embody a certain aspect of the invention.
Figure 3:
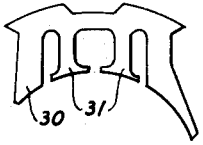
Figs. 3, 4 and 5 are elevational views of laminations included in the pole-pieces shown in Figs. 1 and 2.
Figure 4:
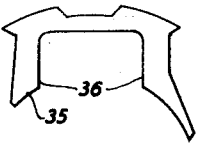

Referring to Figs. 1 and 2, the left-hand end of the pole-piece 17 embodies a predetermined number of contiguously aligned laminations 30 shown in Fig. 3 and having two identical and interior legs 31, 31 onto each of which is applied an individual coil 32 comprising a suitable number of turns and preferably serially connected. As both the coils 32 require a certain amount of space extending axially towards the right-hand end of the pole-piece 17, a predetermined number of laminations 35 shown in Fig. 4 and having an internal opening 36 are disposed adjacent the right-hand side of laminations 30 as illustrated in Figs. 1 and 2. Adjacent the right-hand side of the laminations 35 and extending the remainder of the axial length of the pole-piece 17, Fig. 1, is a plurality of contiguous laminations 19 shown in Fig. 5. Thus, the pole-piece 19 comprises successively contiguous pluralities of laminations 30, 35 and 19 as illustrated in Figs. 1 and 2.

In the operation of Fig. 1, the rotation of the armature 9 causes an alternating wave to be induced in the windings 32, 32 in the well-known manner of an inductor alternator. The frequency of such induced wave depends on the number of radial teeth or segments 16 and the speed of rotation of the armature 9. Obviously, such frequency increases with an increase of armature speed and decreases with a decrease of armature speed. The present invention may be employed to regulate the speed of the motor in the manner of the pilot wave generator disclosed in my patent, supra.

It will be noted that the motor armature windings pass through the effective pilot generator rotor, left-hand end of armature 9 of Fig. 1, so that the latter portion of the armature 9 functions both as a motor and a generator, thereby minimizing the size and weight of the combined structure with reference to similar characteristics of the combined structure of the pilot wave generator and motor disclosed in my patent, supra.

What is claimed is:

1. In combination in an electrical apparatus for generating an alternating wave of certain frequency, an armature formed with a plurality of substantially identical segments each of which extends in both radial and axial directions, a curvilinear portion formed on the outer ends of certain of said segments and extending over the entire axial length thereof, a further curvilinear portion formed on the outer ends of others of said segments and extending partially over the axial length thereof, said further curvilinear portions commencing a predetermined distance from the corresponding ends of said other segments and extending over the remainder of the axial length of said other segments, and stator pole-piece means disposed substantially opposite to the portions of said other segments constituting said predetermined distance.

2. The combination according to claim 1 in which said certain and other segments comprise successively alternate segments.

3. In combination in an electrical motor comprising a plurality of laminations each of which is provided with a circular configuration and embodies a hub portion, a plurality of radial projections attached integrally to said hub portion, and a plurality of curvilinear portions formed integrally on the outer ends of said radial projections, said laminations being so stacked that corresponding radial projections and curvilinear portions lie in axial alignment, and a pair of stator pole-piece means disposed on diametrically opposite sides of said armature; means to generate an alternating wave of certain frequency comprising, at one end of said armature, a predetermined number of said laminations having said curvilinear portions cut off a pre-selected number of said radial projections, and a further stator pole-piece means mounted in the portion of one of said stator pole-piece means opposite said one end of said armature.

4. In combination in an electrical motor comprising a plurality of laminations each of which is provided with a circular configuration and embodies a hub portion, a plurality of radial projections attached integrally to said hub portion, and a plurality of curvilinear portions formed integrally on the outer ends of said radial projections, said laminations being so stacked that said radial projections and curvilinear portions lie in axial alignment, and a pair of stator pole-pieces disposed on diametrically opposite sides of said armature and extending substantially coextensively therewith; means to generate an alternating wave of certain frequency comprising, at one end of said armature, a certain number of said laminations arranged contiguously and having said curvilinear portions attached to certain radial projections and having said curvilinear portions cut off other radial projections, a further stator pole-piece embodied in one of said pair of stator pole-pieces and positioned opposite to said one end of said armature, and an electrical winding applied to said further stator pole-piece.

5. In combination in an electrical motor comprising an armature composed of a plurality of laminations of substantially circular configuration, each of said laminations comprising a hub portion, a plurality of radial projections attached integrally to said hub portion in spoke-like fashion and a curvilinear portion formed integrally on the outer end of each of said radial projections, said laminations being stacked so that said radial projections and curvilinear portions constitute substantially a plurality of unitary axial segments arranged in spoke-like fashion, and a pair of stator pole-pieces disposed on diametrically opposite sides of said armature and extending substantially coextensively therewith; means to generate an alternating wave of certain frequency comprising, at one end of said armature, a pre-selected number of said laminations arranged contiguously and to which said curvilinear portions are attached to corresponding alternate radial projections and from which said curvilinear portions are cut off other corresponding radial projections, a further stator pole-piece mounted in the portion of one of said stator pole-pieces opposite to said one end of said armature, and electrical windings applied to said further stator pole-piece.

6. In an electric motor, a toothed rotor having an even number of teeth, said rotor formed of stacked laminations, pole-pieces for said motor, armature windings in the slots between the rotor teeth, and means to generate a pilot wave, comprising every other tooth provided with a cut-away portion extending from one end of said rotor for a certain axial distance, and stationary electrical windings provided on an inner face of one of said pole-pieces, opposite said cut-away portions.

HUGH M. STOLLER.